(12) United States Patent
Rudnick, III et al.

(10) Patent No.: US 10,537,910 B2
(45) Date of Patent: Jan. 21, 2020

(54) MASTER APPLICATION PATHS FOR COATINGS

(71) Applicant: The Boeing Company, Chicago, IL (US)

(72) Inventors: Fredrick Carl Rudnick, III, Shoreline, WA (US); Robert Stephen Strong, Everett, WA (US); Dennis R. Mathis, North Charleston, SC (US); Paul J. Shirron, Black Diamond, WA (US)

(73) Assignee: The Boeing Company, Chicago, IL (US)

(*) Notice: Subject to any disclaimer, the term of this patent is extended or adjusted under 35 U.S.C. 154(b) by 559 days.

(21) Appl. No.: 15/259,280

(22) Filed: Sep. 8, 2016

(65) Prior Publication Data

US 2018/0065134 A1 Mar. 8, 2018

(51) Int. Cl.
| | |
|---|---|
| *B05B 13/04* | (2006.01) |
| *G05B 19/29* | (2006.01) |
| *B64C 1/00* | (2006.01) |
| *B64F 5/00* | (2017.01) |

(52) U.S. Cl.
CPC .......... *B05B 13/0431* (2013.01); *G05B 19/29* (2013.01); *G05B 2219/35343* (2013.01)

(58) Field of Classification Search
None
See application file for complete search history.

(56) References Cited

U.S. PATENT DOCUMENTS

| | | | |
|---|---|---|---|
| 5,429,682 A * | 7/1995 | Harlow, Jr. | ........... B05B 7/0815 118/316 |
| 7,350,890 B2 | 4/2008 | Baird et al. | |
| 8,455,054 B2 | 6/2013 | Brewer et al. | |
| 2012/0156362 A1* | 6/2012 | Sadovoy | ............... B05B 12/084 427/9 |
| 2015/0081073 A1 | 3/2015 | Trautman et al. | |
| 2015/0343473 A1 | 12/2015 | Mathis | |
| 2016/0130017 A1 | 5/2016 | Best et al. | |

* cited by examiner

*Primary Examiner* — Eric C Wai
(74) *Attorney, Agent, or Firm* — Yee & Associates, P.C.

(57) ABSTRACT

A method of applying a coating to at least a portion of a surface of a structure using reusable master path rules. The surface of the structure is identified to form surface data. A framework for the surface of the structure is generated using the surface data. The framework comprises a plurality of points. Reusable master path rules are created for a master path connecting the plurality of points. The master path is a continuous line representing a universal route for applying coatings to the surface. The coating is applied to the at least a portion of the surface of the structure using the reusable master path rules.

20 Claims, 16 Drawing Sheets

MASTER APPLICATION PATHS FOR COATINGS

BACKGROUND INFORMATION

1. Field

The present disclosure relates generally to coatings and, in particular, to applying the coatings to structures. Still more particularly, the present disclosure relates to applying a coating to a structure using reusable master path rules for the surface of the structure.

2. Background

When manufacturing identical objects in mass production, the same coating is applied to a large number of the same or similar objects. In order to develop the best method of coating application, a coating may first be applied to a number of the objects while adjusting the application path and application settings to obtain desirable quality. After the desirable quality is obtained, the coating is then applied in quantity to hundreds or thousands of identical objects during manufacturing.

For large structures, such as aircraft, the coatings may change for each structure. For example, aircraft customers each require different paint colors to designate specific airlines. Additionally, areas to receive the coatings may change from structure to structure. For example, each aircraft may have different images selected by the aircraft customer. Each coating can have its own unique material characteristics such as viscosity, flash time, transfer coefficient, or other characteristics. Material characteristics of the coating affect the application quality of the coating. Due to the size and expense of large structures, it is not economically feasible to spray multiple test structures for each and every coating to determine an ideal application path.

For example, when applying coatings to large structures, it is desirable to maintain a wet edge during initial application in order to ensure proper blending of subsequent applications. Maintaining such a wet edge enables blending for desirable coating aesthetics.

Robotic painting uses programs to apply paint. Currently, for large structures, a single use application path is manually programmed for each pairing of a designated coating and a designated surface. Manually programming single use paths is at least one of more time consuming, more expensive, or more labor intensive than desired. Therefore, it would be desirable to have a method and apparatus that take into account at least some of the issues discussed above, as well as other possible issues.

SUMMARY

A method of applying a coating to at least a portion of a surface of a structure using reusable master path rules. The surface of the structure is identified to form surface data. A framework for the surface of the structure is generated using the surface data. The framework comprises a plurality of points. Reusable master path rules are created for a master path connecting the plurality of points. The master path is a continuous line representing a universal route for applying coatings to the surface. The coating is applied to the at least a portion of the surface of the structure using the reusable master path rules.

A method of applying a coating to at least a portion of a surface of a structure using reusable master path rules. An area of the surface of the structure is selected to define a selected surface. A plurality of points forms a framework for the surface. A subset of the plurality of points associated with the selected surface is identified. A path connecting the subset of the plurality of points is generated using the reusable master path rules for the surface. A coating is applied to the selected surface using the path.

A system for applying a coating to at least a portion of a surface of a structure using reusable master path rules comprises a framework generator, a master path generator, and a controller. The framework generator is configured to generate a framework for the surface of the structure using surface data, wherein the framework comprises a plurality of points. The master path generator is configured to create reusable master path rules for a master path connecting the plurality of points, wherein the master path is a continuous line representing a universal route for applying coatings to the surface. The controller is configured to control an application tool to apply the coating to the at least a portion of the surface of the structure using the reusable master path rules.

A system for applying a coating to at least a portion of a surface of a structure using reusable master path rules comprises a path generator and a controller. The path generator is configured to identify a subset of a plurality of points associated with a selected surface and generate a path connecting the subset of the plurality of points, wherein the selected surface is an area of the surface of the structure, wherein the plurality of points forms a framework for the surface, and wherein the generating the path connecting the subset of the plurality of points uses the reusable master path rules for the surface. The controller is configured to control an application tool to apply the coating to the selected surface using the path.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that current robotic painting requires very time consuming programming of robot programs for different paint systems, different subsections of same large structure for each basecoat and design color. As robotic painting becomes more and more common, there is a need for a faster creation of path programs. The illustrative embodiments recognize and take into account that the path programs may be created more quickly by exploiting common information about part geometry and paint system characteristics.

The illustrative embodiments further recognize and take into account that current robot/automation programming systems do not distinguish between two types of parameters: the geometric parameters used to create the paths and the application parameters that may be changed in the programming system or on the robot controller. The illustrative embodiments recognize and take into account that as a result, each new area to be painted, or each area to be painted with a different set of painting parameters, currently uses its own set of geometric models. Currently, painting is surface-based and current programming tools for robotic/automated painting use a support surface and the edge boundaries on the support surface to create the paint path trajectories.

Figure 1:
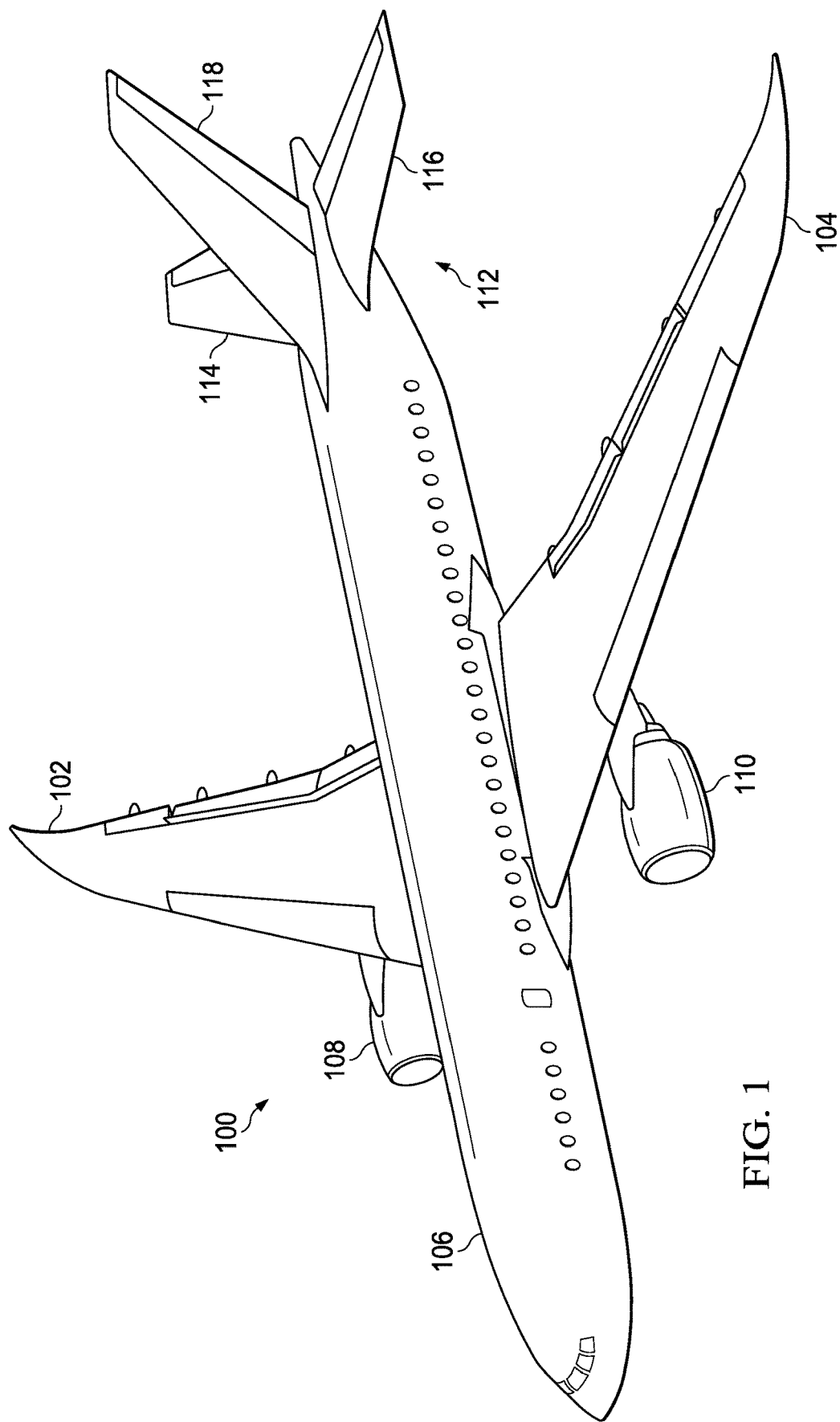
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having coatings. For example, the coatings may be applied to the surface of at least one of wing 102, wing 104, body 106, or tail section 112 to decorate the surface or provide desirable surface properties.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, an illustrative embodiment may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable structures.

Figure 2:
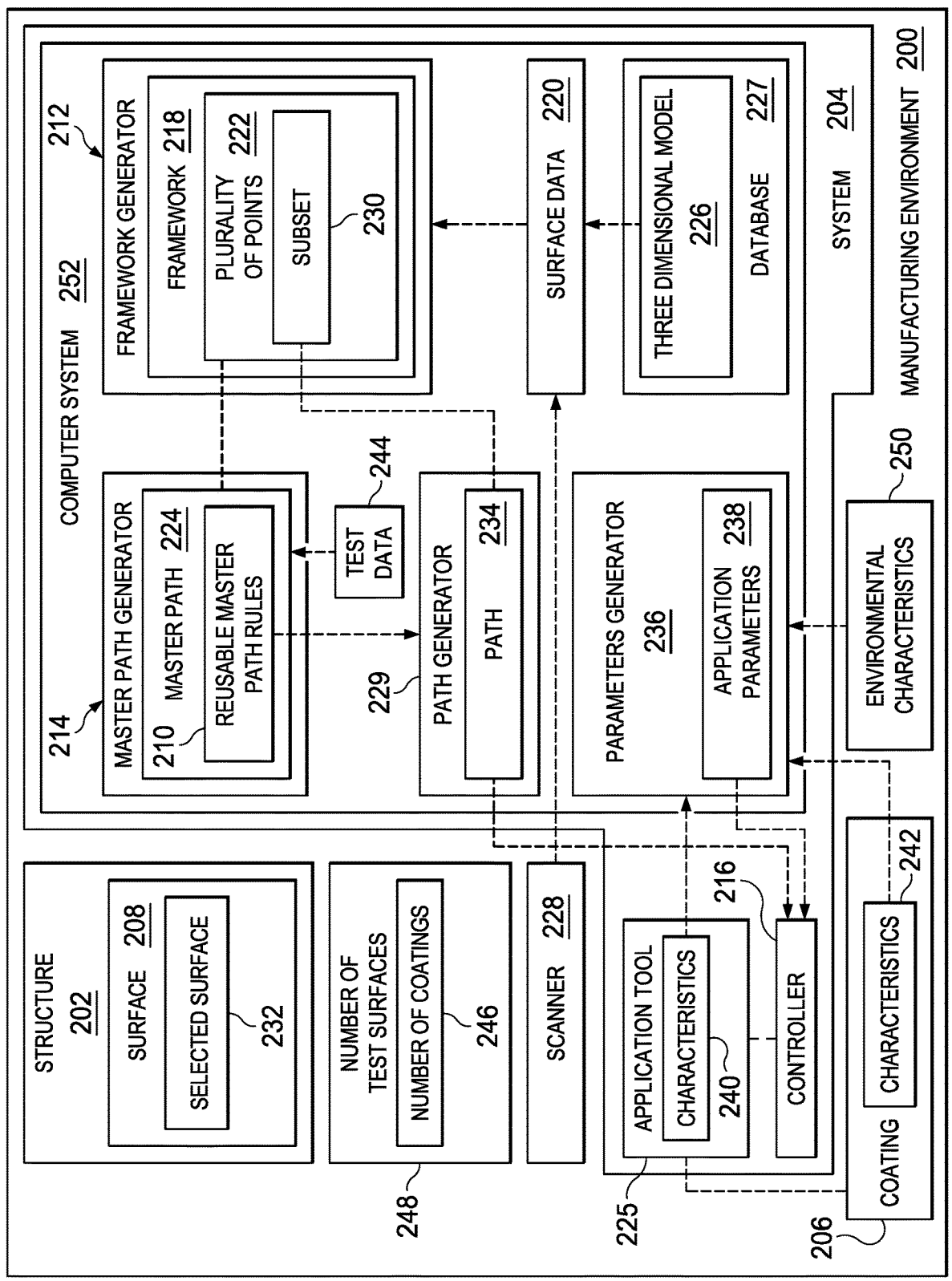
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment in which structure 202 is manufactured. In some illustrative examples, structure 202 may take the form of aircraft 100 of FIG. 1.

Manufacturing environment 200 includes system 204 for applying coating 206 to at least a portion of surface 208 of structure 202 using reusable master path rules 210. In some illustrative examples, system 204 includes framework generator 212, master path generator 214, and controller 216. Controller 216 is configured to control application of coating 206 to at least a portion of surface 208 of structure 202 using reusable master path rules 210.

Controller 216 may be implemented using software, hardware, firmware, or a combination thereof. When software is used, the operations performed by the controller may be implemented using, for example, without limitation, program code configured to run on a processor unit. When firmware is used, the operations performed by the controller may be implemented using, for example, without limitation, program code and data and stored in persistent memory to run on a processor unit.

When hardware is employed, the hardware may include one or more circuits that operate to perform the operations performed by the controller(s). Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and/or processes performed by the controller(s) may be performed using organic components integrated with inorganic components. In some cases, the operations and/or processes may be performed by entirely organic components, excluding a human being. As one illustrative example, circuits in organic semiconductors may be used to perform these operations and/or processes.

Framework generator 212 is configured to generate framework 218 for surface 208 of structure 202 using surface data 220. Framework 218 comprises plurality of points 222. In some illustrative examples, framework 218 may be referred to as a "grid" of points. Plurality of points 222 may have any desirable spacing based on characteristics of surface 208. Accordingly, framework 218 may be an evenly spaced grid, a curved grid, or a grid having any desirable spacing or shape.

In some illustrative examples, plurality of points 222 is spaced evenly. In other illustrative examples, plurality of points 222 is spaced based on chordal deviation.

A first spacing for plurality of points 222 is chosen based on a size of a plume for applying coating 206. The first spacing is in a direction perpendicular to the motion of application tool 225. When the movement of application tool 225 is substantially parallel to the floor of manufacturing environment 200, the movement of application tool 225 may be referred to as "horizontal." When the movement of application tool 225 is "horizontal," the vertical spacing for plurality of points 222 is chosen based on a size of a plume for applying coating 206. In this example, the first spacing may be in vertical direction relative the floor of manufacturing environment 200.

A second spacing for plurality of points 222 is based on the curvature of surface 208. The second spacing is in the direction of the movement of application tool 225. When the movement of application tool 225 is substantially parallel to the floor of manufacturing environment 200, the second spacing for plurality of points 222 may be referred to as a "horizontal spacing."

Master path generator is configured to create reusable master path rules 210 for master path 224 connecting plurality of points 222. Master path 224 is a continuous line representing a universal route for applying coatings to surface 208. Controller 216 is configured to control application tool 225 to apply coating 206 to the at least a portion of surface 208 of structure 202 using reusable master path rules 210.

In some examples, framework generator 212 is further configured to identify surface 208 to form surface data 220. In these examples, identifying surface 208 of structure 202 comprises analyzing three-dimensional model 226 to form surface data 220.

Three-dimensional model 226 may be stored within database 227. Three-dimensional model 226 may be formed using input from operators. For example, three-dimensional model 226 may be a design file for structure 202 created by a three-dimensional computer aided design software program. However, sometimes the design file may be held by another party or may be proprietary. In other illustrative examples, three-dimensional model 226 may be formed by scanning structure 202. For example, scanner 228 may scan surface 208 to form scanning data. The scanning data may be used to form three-dimensional model 226.

In some illustrative examples, system 204 includes path generator 229 and controller 216. Path generator 229 is configured to identify subset 230 of plurality of points 222 associated with selected surface 232 and generate path 234 connecting subset 230 of plurality of points 222. Selected surface 232 is an area of surface 208 of structure 202. Plurality of points 222 forms framework 218 for surface 208. Generating path 234 connecting subset 230 of plurality of points 222 uses reusable master path rules 210 for surface 208. In these illustrative examples, controller 216 is configured to control application tool 225 to apply coating 206 to selected surface 232 using path 234.

In some examples, path generator 229 is further configured to select an area of surface 208 of structure 202 to define selected surface 232. In other examples, an operator may select the area of surface 208 of structure 202 to define selected surface 232. Selected surface 232 may be indicated by a bounding box or any other desirable type of indicator.

In some examples, system 204 further comprises application tool 225 and parameters generator 236. Application tool 225 is configured to apply coating 206 to selected surface 232. Parameters generator 236 is configured to select application parameters 238 for application tool 225 using characteristics 240 of application tool 225 and characteristics 242 of coating 206. In these examples, controller 216 is configured to control application tool 225 according to application parameters 238. Controller 216 may be configured to control application tool 225 to apply coating 206 to selected surface 232 using path 234 and application parameters 238.

Prior to applying coating 206 to surface 208, reusable master path rules 210 are generated. Reusable master path rules 210 are generated based on test data 244 from testing number of coatings 246 on number of test surfaces 248. As used herein, "a number of" when used with reference to items means one or more items. Thus, number of coatings 246 is one or more coatings. Number of test surfaces 248 is substantially similar to surface 208 of structure 202. For example, number of test surfaces 248 may be made of the same or substantially similar materials as surface 208. Further, number of test surfaces 248 may have at least one of the same or substantially similar size or shape to surface 208.

Reusable master path rules 210 for master path 224 are created using test data 244. Each of number of coatings 246 has at least a minimum desirable quality when applied to surface 208 of structure 202 using master path 224. Reusable master path rules 210 produce at least a minimum desirable quality for all of number of coatings 246 on surface 208. Although reusable master path rules 210 produce desirable quality for all of number of coatings 246, reusable master path rules 210 may not produce the best possible quality for each of number of coatings 246. Reusable master path rules 210 are a set of universal rules for all coatings to be applied to surface 208 or a portion of surface 208. Individually programmed rules may produce a higher quality application for a specific coating of number of coatings 246. However, individually programmed rules are only applicable for that specific coating.

By reusing reusable master path rules 210, master path 224 may be positionally transformed to apply coating 206 to selected surface 232. Master path 224 may be discretized to fit selected surface 232.

Application parameters 238 are used in conjunction with reusable master path rules 210 to achieve at least a minimum desirable quality for coating 206. More specifically, application parameters 238 are used in conjunction with path 234 generated using reusable master path rules 210 to achieve at least a minimum desirable quality for coating 206. Application parameters 238 include at least one of speed of application tool 225, pressure, distance of application tool 225 from surface 208, or any other desirable parameter.

Application parameters 238 are selected for application tool 225 based on at least one of characteristics 240 of application tool 225, characteristics 242 of coating 206, or environmental characteristics 250. Characteristics 240 of application tool 225 include at least one of tool type, plume size, or any other desirable characteristics of application tool 225. Characteristics 242 of coating 206 include at least one of viscosity, flash time, transfer coefficient, or any other desirable characteristics of coating 206. Environmental characteristics 250 include at least one of humidity, environmental temperature, air speed, or any other desirable characteristics of manufacturing environment 200.

Selected surface 232 may be any desirable size or shape. Selected surface 232 is not limited to regular or symmetrical shapes. Masking may be present at least one of inside or outside of selected surface 232 to cover portions of surface 208 where coating 206 is undesirable. Masking may be used to form shapes or patterns of coating 206.

Subset 230 may be selected based on any desirable information. For example, subset 230 may be selected based on at least one of characteristics 242 of coating 206 or characteristics 240 of application tool 225. Further, subset 230 may be selected based on reusable master path rules 210.

As depicted, components of system 204 may be implemented in computer system 252. For example, at least one of framework generator 212, master path generator 214, path generator 229, parameters generator 236, or database 227 may be implemented in computer system 252.

The illustration of manufacturing environment 200 in FIG. 2 is not meant to imply physical or architectural limitations to the manner in which an illustrative embodiment is implemented. Other components in addition to or in place of the ones illustrated may be used. Some components may be unnecessary. For example, although controller 216 is shown separate from computer system 252 and application tool 225, controller 216 may be implemented as part of computer system 252 or application tool 225. As another example, although only a single controller, controller 216, is depicted, in some illustrative examples, multiple controllers may be present. For example, one controller may control the plume and spray of application tool 225 while another controller controls the motion of application tool 225 relative to structure 202. In this example, each controller would be in communication with computer system 252.

As yet another example, computer system 252 may be comprised of one or more computers. When more than one computer is present in the computer system, these computers may be in communication with each other. In some examples, at least one of framework generator 212, master path generator 214, path generator 229, parameters generator 236, or database 227 may be implemented in different computers within computer system 252.

Figure 3:
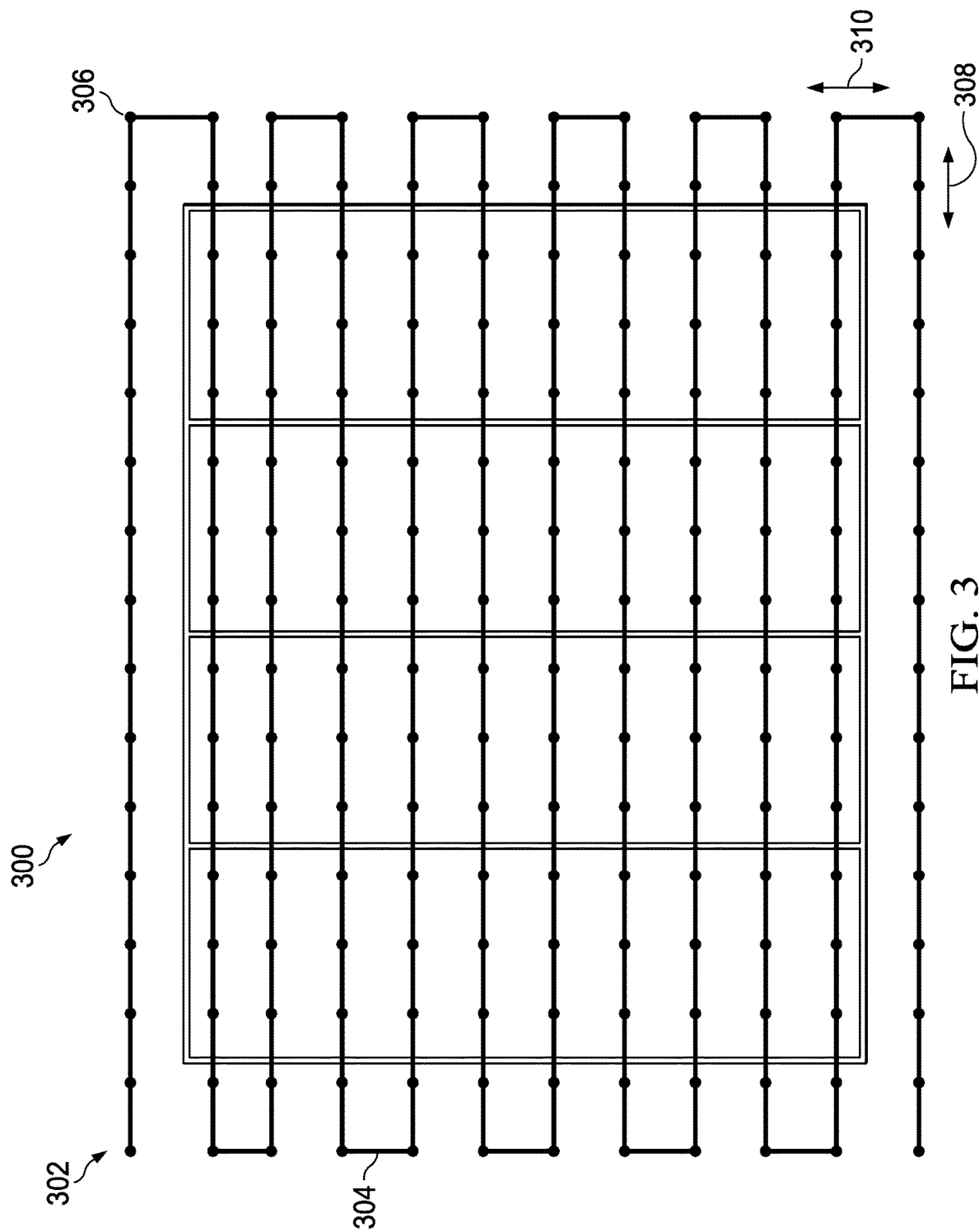
FIG. 3 is an illustration of a surface of a structure with a framework and a master path in accordance with an illustrative embodiment.

Turning now to FIG. 3, an illustration of a surface of a structure with a framework and a master path is depicted in accordance with an illustrative embodiment. Surface 300 may be a representation of surface 208 of FIG. 2.

Surface 300 has framework 302 and master path 304. Framework 302 may be a representation of framework 218 of FIG. 2. Framework 302 includes plurality of points 306. As depicted, framework 302 has equal spacing between each of plurality of points 306. In this illustrative example, surface 300 may be substantially planar.

Master path 304 may be a representation of master path 224 of FIG. 2. Master path 304 connects all of plurality of points 306 in framework 302. Master path 304 is selected based on test data for a number of coatings on a number of test surfaces substantially similar to surface 300. The number of test surfaces may be made of the same or substantially similar materials as surface 300. Further, the number of test surfaces may have at least one of the same or substantially similar size or shape to surface 300.

Master path 304 connects plurality of points 306 in direction 308. In other words, an application tool would move in direction 308 to apply a coating to surface 300 using master path 304. Spacing of plurality of points 306 in direction 308 is based on curvature of surface 300. In some examples, direction 308 may be substantially parallel to the manufacturing floor, and may be referred to as "horizontal." Thus, master path 304 may be referred to as a horizontal serpentine path.

Spacing of plurality of points 306 in direction 310 is based on a plume size for applying a coating to surface 300. When spacing in direction 308 is referred to as "horizontal," spacing in direction 310 may be referred to as "vertical."

Figure 4:
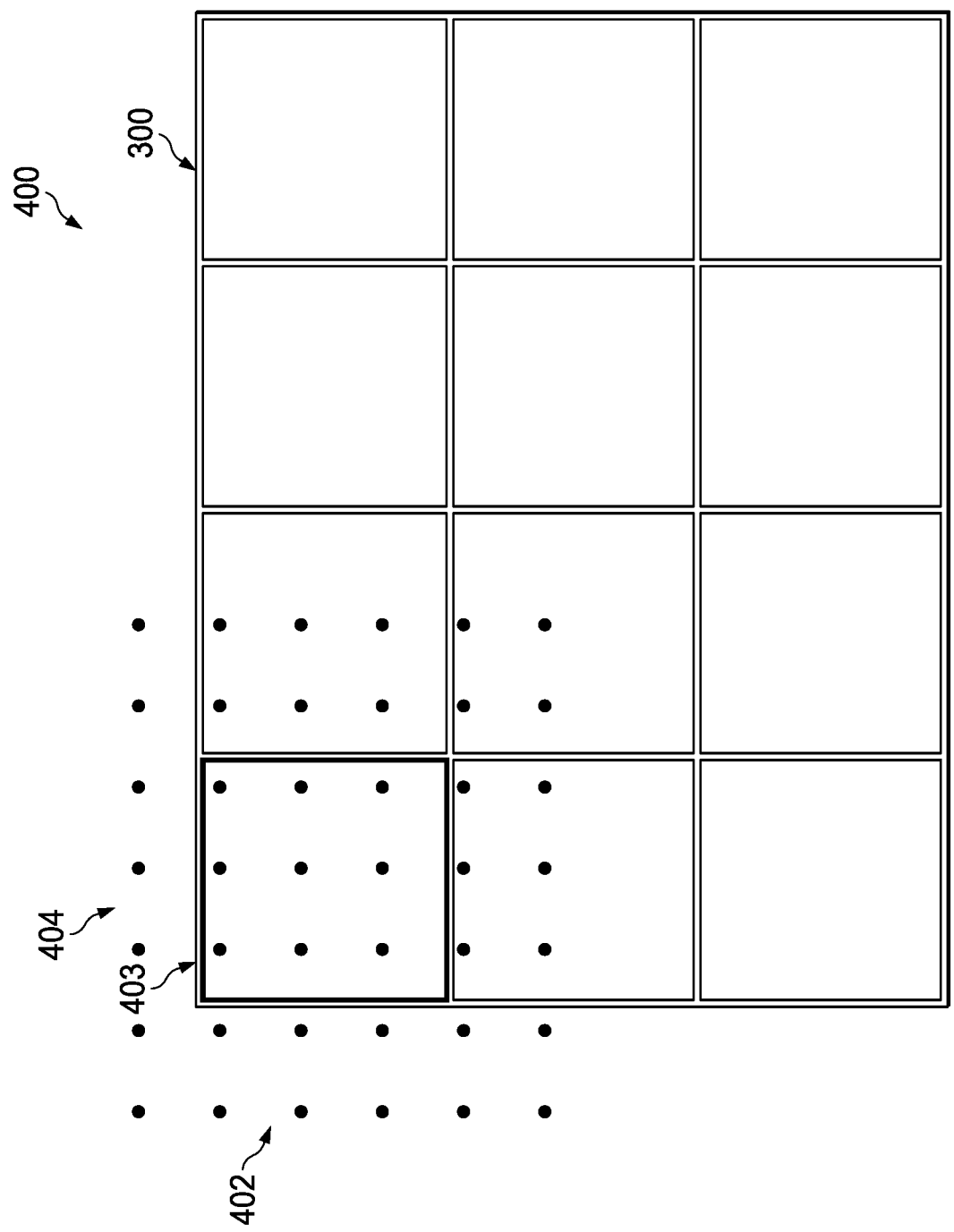
FIG. 4 is an illustration of a selected surface of a structure and a subset of a plurality of points associated with the selected surface in accordance with an illustrative embodiment.

Turning now to FIG. 4, an illustration of a selected surface of a structure and a subset of a plurality of points associated with the selected surface is depicted in accordance with an illustrative embodiment. View 400 is a view of surface 300 with selected surface 402. Selected surface 402 is a representation of selected surface 232 of FIG. 2. Selected surface 402 is identified by bounding box 403. Bounding box 403 may represent an alternative color or coating as part of an airline livery scheme.

In some examples, selected surface 402 may be selected by an operator. In other examples, selected surface 402 is selected by a processor, such as computer system 252 of FIG. 2.

Subset 404 of plurality of points 306 is associated with selected surface 402. In some illustrative examples, subset 404 is selected by an operator. In other illustrative examples, subset 404 is selected by a framework generator, such as framework generator 212 of FIG. 2. Subset 404 is selected based on characteristics of the coating to be applied. Subset 404 may also be selected based on turn on and turn off points for the application tool.

As depicted, subset 404 extends outside of bounding box 403. Although not shown, masking may be present at least one of inside or outside of bounding box 403. More specifically, the masking may be used to cover areas where the coating is not desired. Further, the masking may be used to create patterns or designs for the coating.

Figure 5:
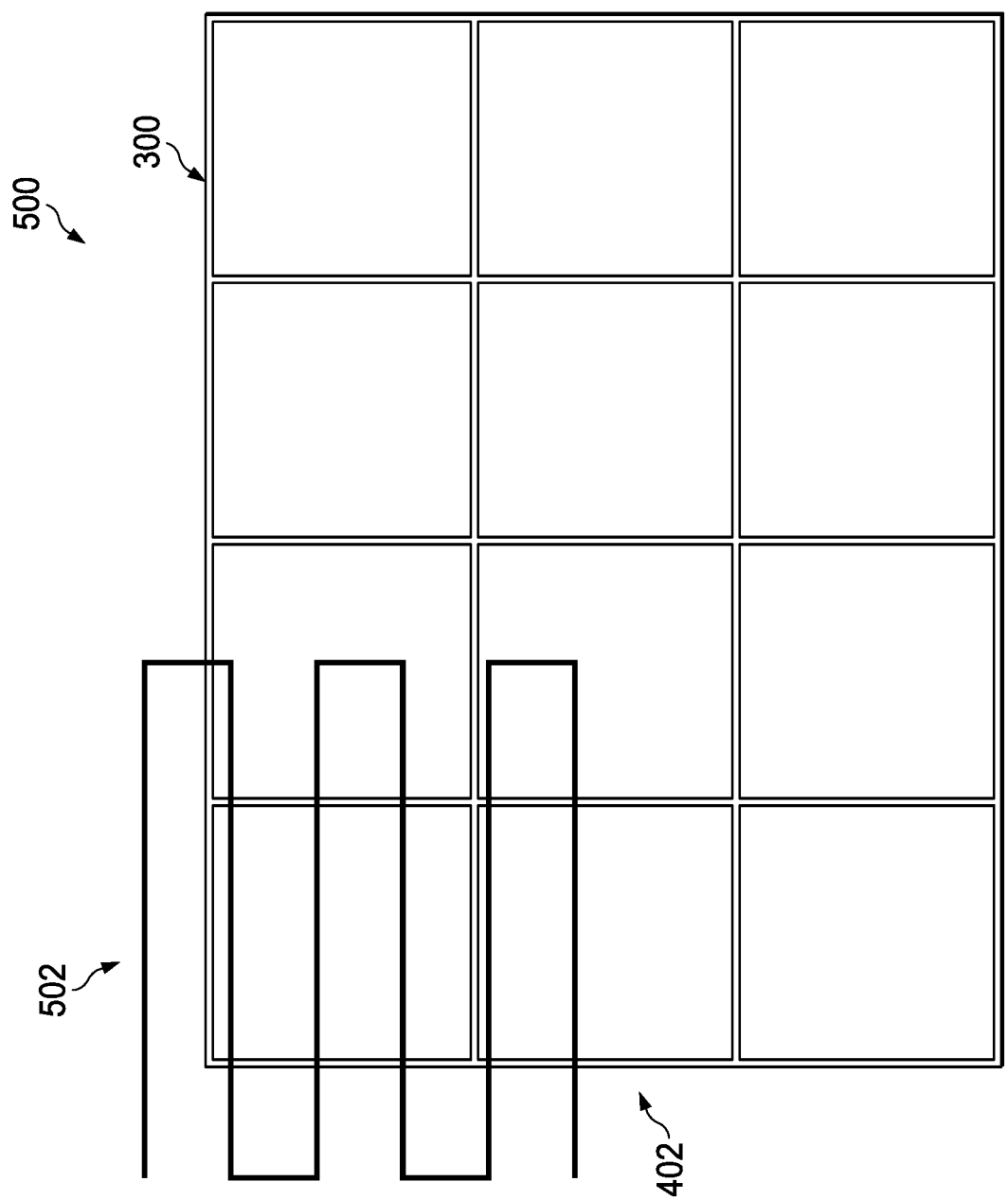
FIG. 5 is an illustration of a path for a selected surface in accordance with an illustrative embodiment.

Turning now to FIG. 5, an illustration of a path for a selected surface is depicted in accordance with an illustrative embodiment. View 500 is a view of surface 300 with path 502 for selected surface 402. Path 502 is a representation of path 234 of FIG. 2.

Path 502 for selected surface 402 resembles master path 304 of FIG. 3. Path 502 is generated using reusable master path rules for master path 304. A coating is applied to selected surface 402 using path 502 and application parameters generated for the desired coating and desired application tool.

By using path 502 and application parameters for the desired coating and desired application tool, the desired coating is applied to selected surface 402 with a desired quality. For example, the desired coating is applied to selected surface 402 with suitable wet edges on adjacent passes to promote blending.

Figure 6:
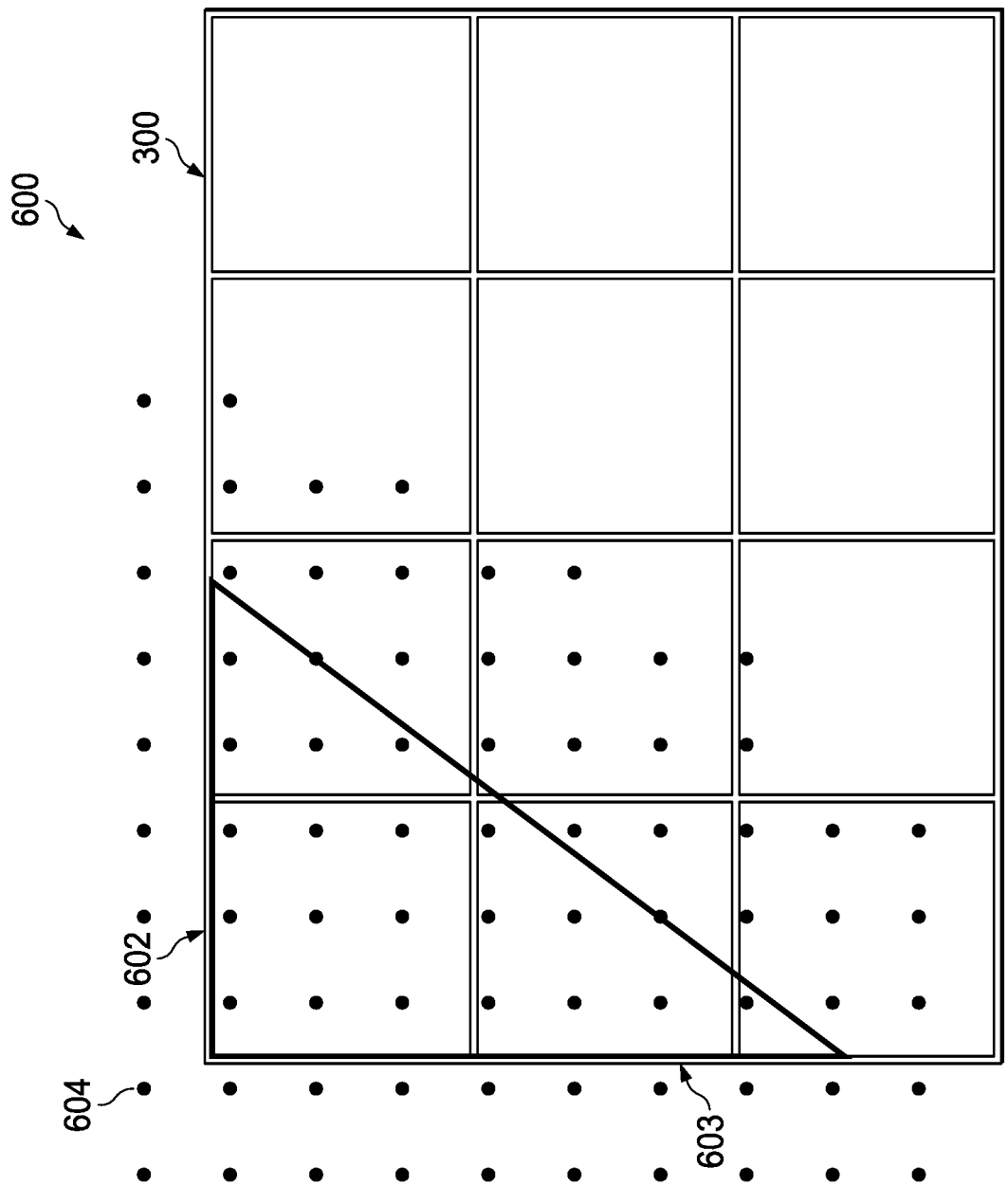
FIG. 6 is an illustration of a selected surface of a structure and a subset of a plurality of points associated with the selected surface in accordance with an illustrative embodiment.

Turning now to FIG. 6, an illustration of a selected surface of a structure and a subset of a plurality of points associated with the selected surface is depicted in accordance with an illustrative embodiment. View 600 is a view of surface 300 having selected surface 602. Selected surface 602 is identified by bounding box 603.

In some examples, selected surface 602 may be selected by an operator. In other examples, selected surface 602 is selected by a processor, such as computer system 252 of FIG. 2.

Subset 604 of plurality of points 306 is associated with selected surface 602. In some illustrative examples, subset 604 is selected by an operator. In other illustrative examples, subset 606 is selected by a framework generator, such as framework generator 212 of FIG. 2. In some examples, subset 606 is selected to provide for desirable coverage of selected surface 602 with a coating. In some examples, subset 606 is selected for desirable locations to start and stop the application tool.

As depicted, subset 604 extends outside of bounding box 603. Although not shown, masking may be present at least one of inside or outside of bounding box 603. More specifically, the masking may be used to cover areas where the coating is not desired. Further, the masking may be used to create patterns or designs for the coating.

Figure 7:
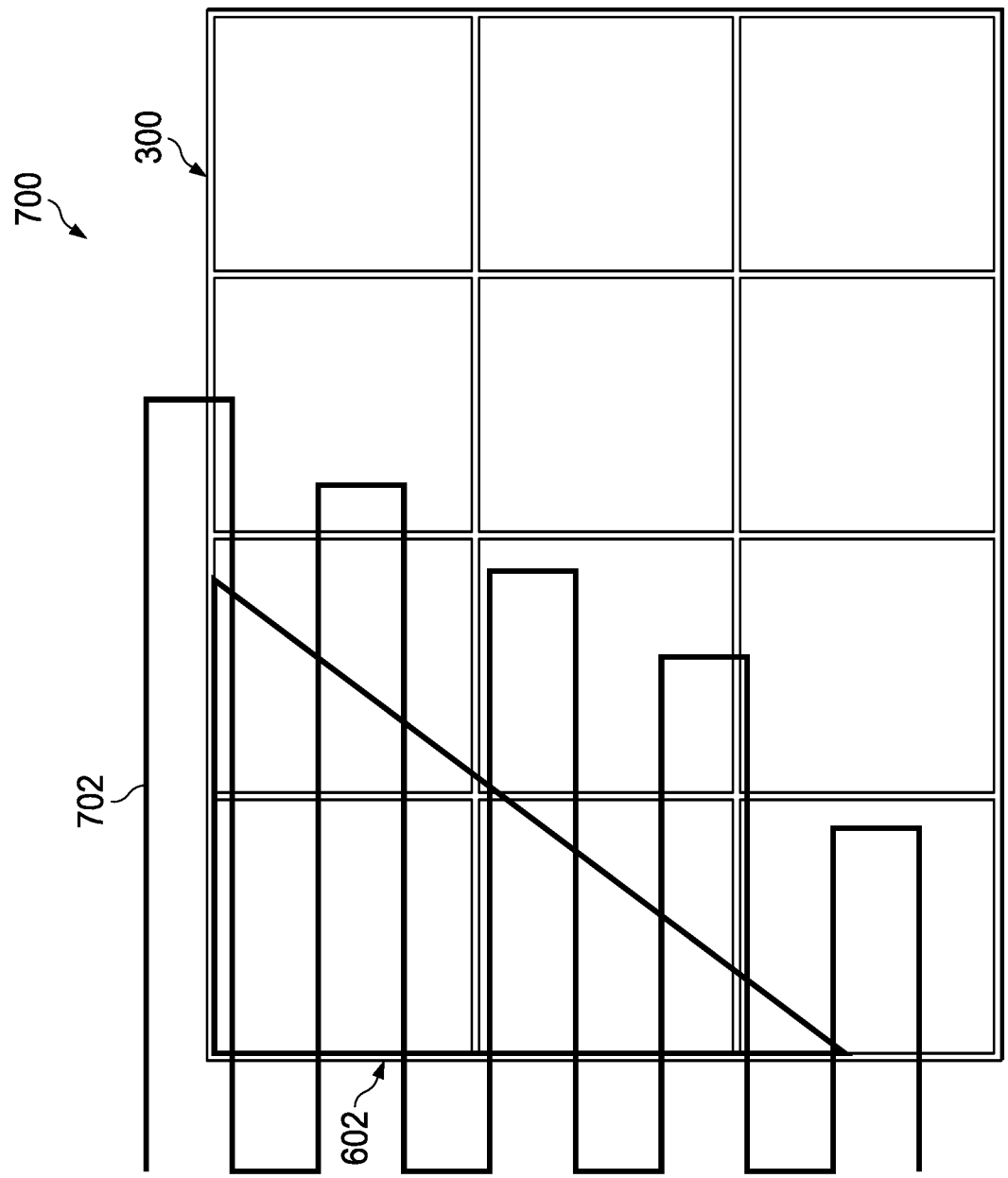
FIG. 7 is an illustration of a path for a selected surface in accordance with an illustrative embodiment.

Turning now to FIG. 7, an illustration of a path for a selected surface is depicted in accordance with an illustrative embodiment. View 700 is a view of surface 300 with path 702 for selected surface 602.

Path 702 for selected surface 602 resembles master path 304 of FIG. 3. Path 702 is generated using reusable master path rules for master path 304. A coating is applied to selected surface 602 using path 702 and application parameters generated for the desired coating and desired application tool.

By using path 702 and application parameters for the desired coating and desired application tool, the desired coating is applied to selected surface 602 with a desired quality. For example, the desired coating is applied to selected surface 602 with wet edges to promote blending.

Figure 8:
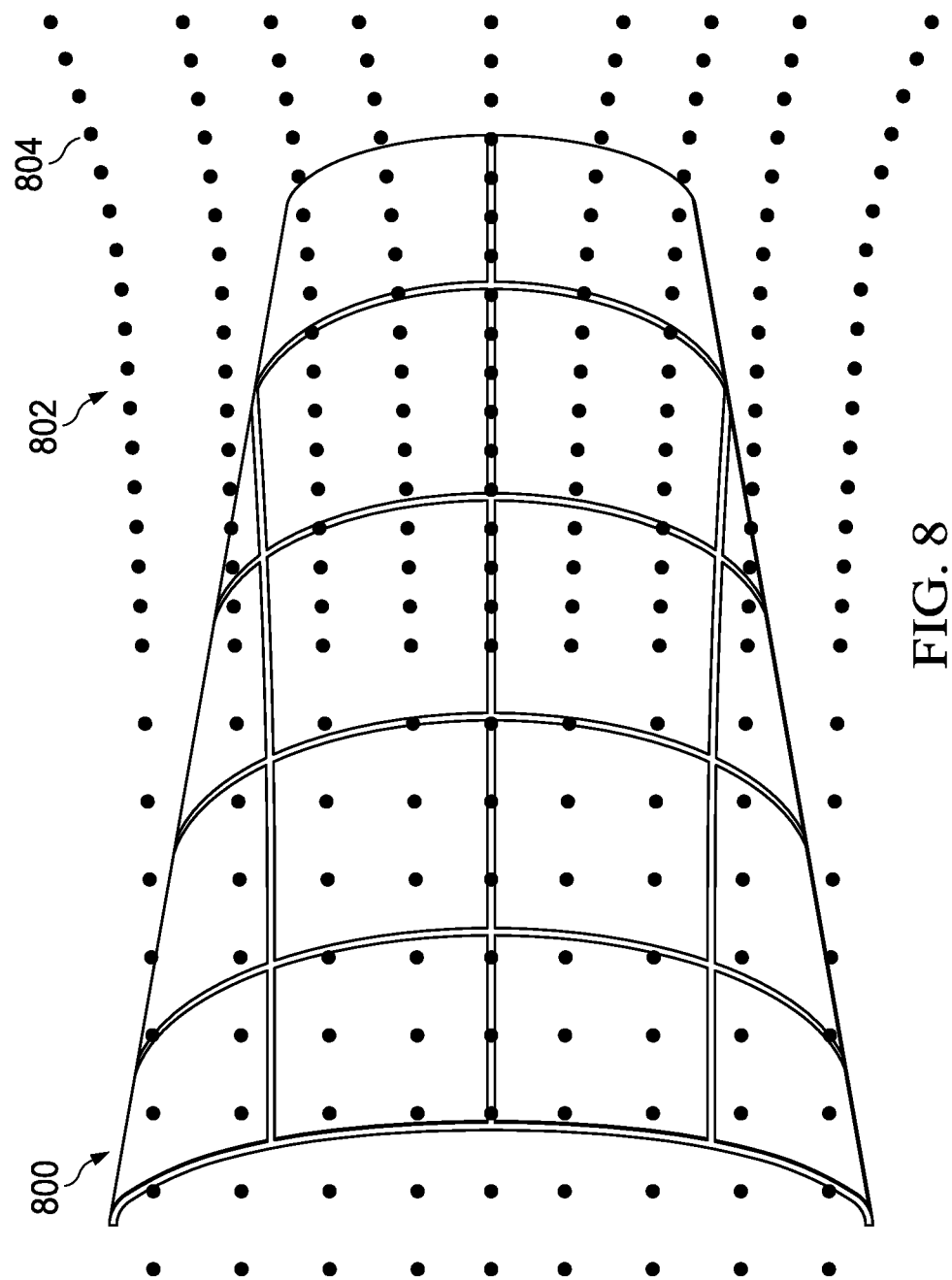
FIG. 8 is an illustration of a surface of a structure with a framework in accordance with an illustrative embodiment.

Turning now to FIG. 8, an illustration of a surface of a structure with a framework is depicted in accordance with an illustrative embodiment. Surface 800 may be a representation of surface 208 of FIG. 2.

Surface 800 has framework 802. Framework 802 is a representation of framework 218 of FIG. 2. Framework 802 includes plurality of points 804. As depicted, spacing between plurality of points 804 varies across framework 802. The spacing between plurality of points 804 varies due to the curvature of surface 800.

Figure 9:
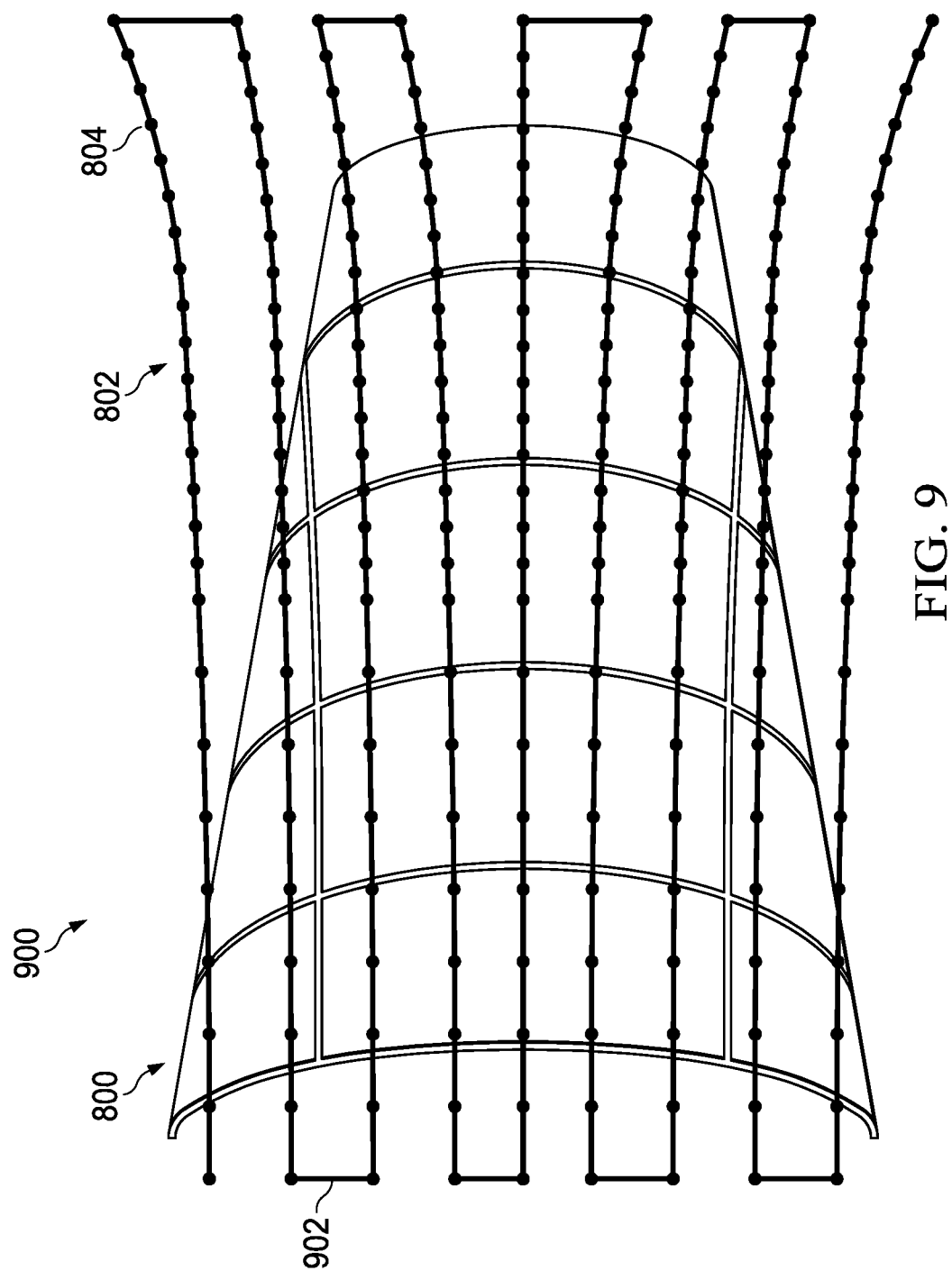
FIG. 9 is an illustration of a surface of a structure with a framework and a master path in accordance with an illustrative embodiment.

Turning now to FIG. 9, an illustration of a surface of a structure with a framework and a master path is depicted in accordance with an illustrative embodiment. View 900 is a view of surface 800 with master path 902.

Master path 902 may be a representation of master path 224 of FIG. 2. Master path 902 connects all of plurality of points 804 in framework 802. Master path 902 is selected based on test data for a number of coatings on a number of test surfaces substantially similar to surface 800. The number of test surfaces may be made of the same or substantially similar materials as surface 800. Further, the number of test surfaces may have at least one of the same or substantially similar size or shape to surface 800.

Figure 10:
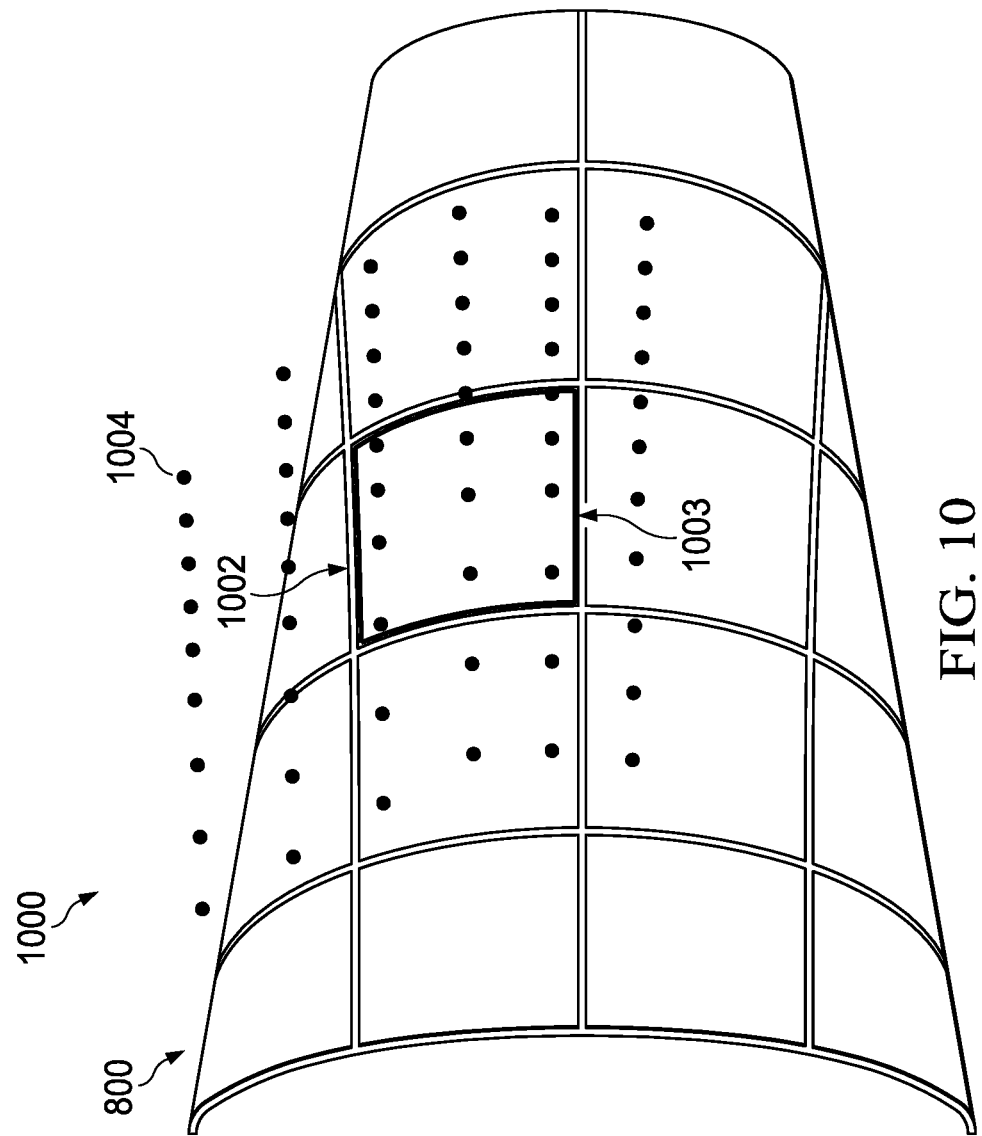
FIG. 10 is an illustration of a selected surface of a structure and a subset of a plurality of points associated with the selected surface in accordance with an illustrative embodiment.

Turning now to FIG. 10, an illustration of a selected surface of a structure and a subset of a plurality of points associated with the selected surface is depicted in accordance with an illustrative embodiment. View 1000 is a view of surface 800 with selected surface 1002. Selected surface 1002 is a representation of selected surface 232 of FIG. 2. Selected surface 1002 is identified by bounding box 1003.

In some examples, selected surface 1002 may be selected by an operator. In other examples, selected surface 1002 is selected by a processor, such as computer system 252 of FIG. 2.

Subset 1004 of plurality of points 804 is associated with selected surface 1002. In some illustrative examples, subset 1004 is selected by an operator. In other illustrative examples, subset 1004 is selected by a framework generator, such as framework generator 212 of FIG. 2. Subset 1004 is selected based on characteristics of the coating to be applied.

As depicted, subset 1004 extends outside of bounding box 1003. Although not shown, masking may be present at least one of inside or outside of bounding box 1003. More specifically, the masking may be used to cover areas where the coating is not desired. Further, the masking may be used to create patterns or designs for the coating.

Figure 11:
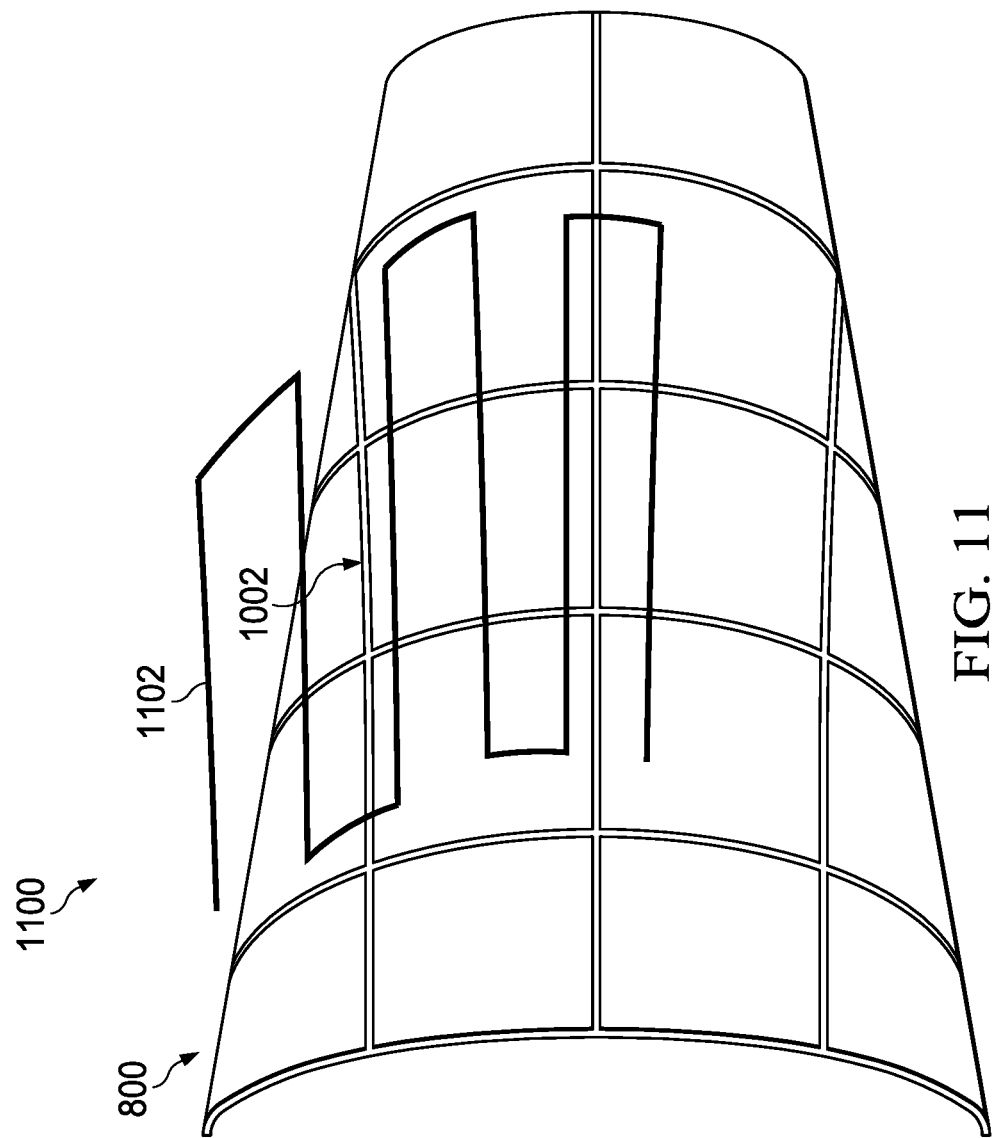
FIG. 11 is an illustration of a path for a selected surface in accordance with an illustrative embodiment.

Turning now to FIG. 11, an illustration of a path for a selected surface is depicted in accordance with an illustrative embodiment. View 1100 is a view of surface 800 with path 1102 for selected surface 1002.

Path 1102 for selected surface 1002 resembles master path 902 of FIG. 9. Path 1102 is generated using reusable master path rules for master path 902. A coating is applied to selected surface 1002 using path 1102 and application parameters generated for the desired coating and desired application tool.

By using path 1102 and application parameters for the desired coating and desired application tool, the desired coating is applied to selected surface 1002 with a desired quality. For example, the desired coating is applied to selected surface 1002 with wet edges to promote blending.

Figure 12:
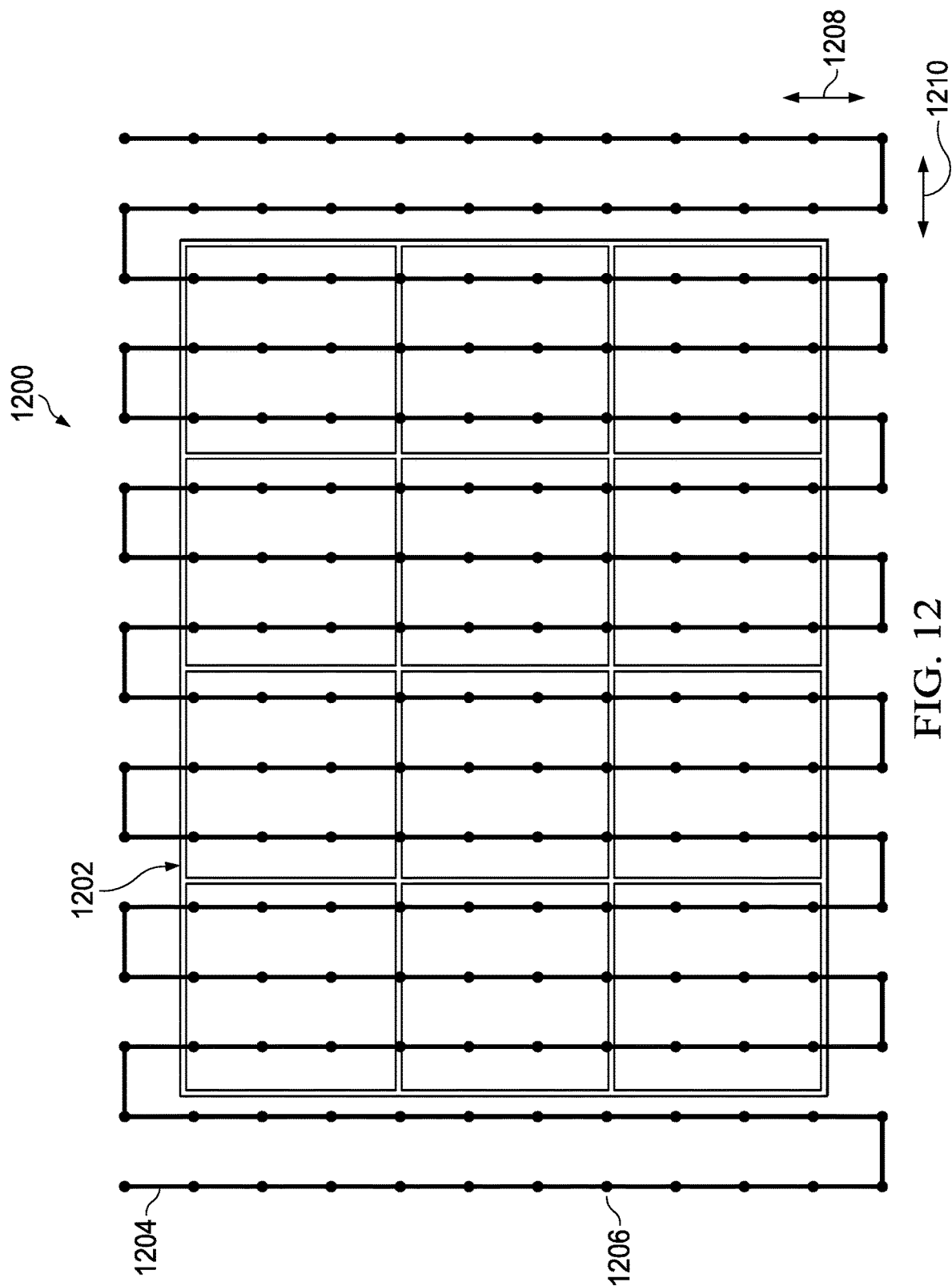
FIG. 12 is an illustration of a surface of a structure with a framework and a master path in accordance with an illustrative embodiment.

Turning now to FIG. 12, an illustration of a surface of a structure with a framework and a master path is depicted in accordance with an illustrative embodiment. Surface 1200 may be a representation of surface 208 of FIG. 2. Surface 1200 may be the same as surface 300 of FIG. 3.

Surface 1200 has framework 1202 and master path 1204. Framework 1202 may be a representation of framework 218 of FIG. 2. Framework 1202 includes plurality of points 1206. As depicted, framework 1202 has equal spacing between each of plurality of points 1206. In this illustrative example, surface 1200 may be substantially planar.

Master path 1204 may be a representation of master path 224 of FIG. 2. Master path 1204 connects all of plurality of points 1206 in framework 1202. As depicted, master path 1204 may be described as a vertical serpentine path. Master path 1204 is selected based on test data for a number of coatings on a number of test surfaces substantially similar to surface 1200. The number of test surfaces may be made of the same or substantially similar materials as surface 1200. Further, the number of test surfaces may have at least one of the same or substantially similar size or shape to surface 1200.

When surface 1200 is the same as surface 300 of FIGS. 3-7, master path 1204 may be an alternative to master path 304 of FIG. 3. One of master path 1204 or master path 304 may be selected based on at least one of the characteristics of the application tool or the characteristics of the coating.

Master path 1204 connects plurality of points 1206 in direction 1208. In other words, an application tool would move in direction 1208 to apply a coating to surface 1200 using master path 1204. Spacing of plurality of points 1206 in direction 1208 is based on curvature of surface 1200. In some examples, direction 308 may be substantially perpendicular to the manufacturing floor, and may be referred to as "vertical." Thus, master path 1204 may be referred to as a vertical serpentine path.

Spacing of plurality of points 1206 in direction 1210 is based on a plume size for applying a coating to surface 1200. When spacing in direction 1208 is referred to as "vertical," spacing in direction 1210 may be referred to as "horizontal."

As depicted, master path 1204 is a vertical serpentine path. As depicted in FIG. 3, master path 304 is a horizontal serpentine path. Some coatings or some application tools may have more desirable applications using a vertical serpentine path as compared to a horizontal serpentine path.

As depicted, surface 1200 and surface 300 are substantially similar. Framework 1202 and framework 302 are also substantially similar. If surface 300 and surface 1200 were curved, framework 302 and framework 1202 may be different from each other due to the curvature of surface 300 and surface 1200.

Figure 13:
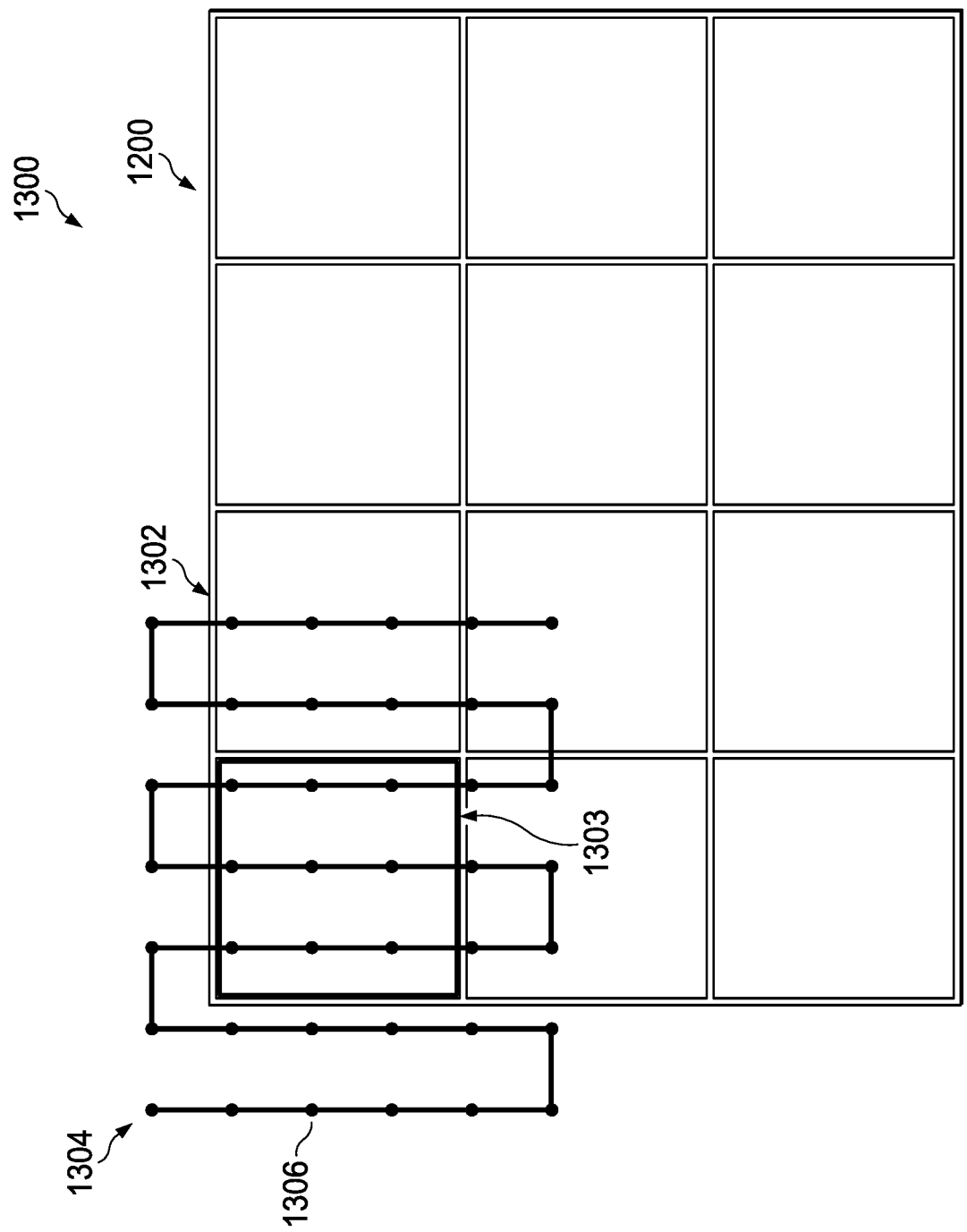
FIG. 13 is an illustration of a selected surface of a structure, a subset of a plurality of points associated with the selected surface, and a path in accordance with an illustrative embodiment.

Turning now to FIG. 13, an illustration of a selected surface of a structure, a subset of a plurality of points associated with the selected surface, and a path is depicted in accordance with an illustrative embodiment. View 1300 is a view of surface 1200 with selected surface 1302. Selected surface 1302 is a representation of selected surface 232 of FIG. 2. Selected surface 1302 is identified by bounding box 1303.

In some examples, selected surface 1302 may be selected by an operator. In other examples, selected surface 1302 is selected by a processor, such as computer system 252 of FIG. 2.

Subset 1304 of plurality of points 1206 of FIG. 12 is associated with selected surface 1302. In some illustrative examples, subset 1304 is selected by an operator. In other illustrative examples, subset 1304 is selected by a framework generator, such as framework generator 212 of FIG. 2. Subset 1304 is selected based on characteristics of the coating to be applied.

As depicted, subset 1304 extends outside of bounding box 1303. Although not shown, masking may be present at least one of inside or outside of bounding box 1303. More specifically, the masking may be used to cover areas where the coating is not desired. Further, the masking may be used to create patterns or designs for the coating.

View 1300 also includes path 1306 for selected surface 1302. Path 1306 is a representation of path 234 of FIG. 2. Path 1306 for selected surface 1302 resembles master path 1204 of FIG. 12. Path 1306 is generated using reusable master path rules for master path 1204. A coating is applied to selected surface 1302 using path 1306 and application parameters generated for the desired coating and desired application tool.

By using path 1306 and application parameters for the desired coating and desired application tool, the desired coating is applied to selected surface 1302 with a desired quality. For example, the desired coating is applied to selected surface 1302 with wet edges to promote blending.

Figure 14:
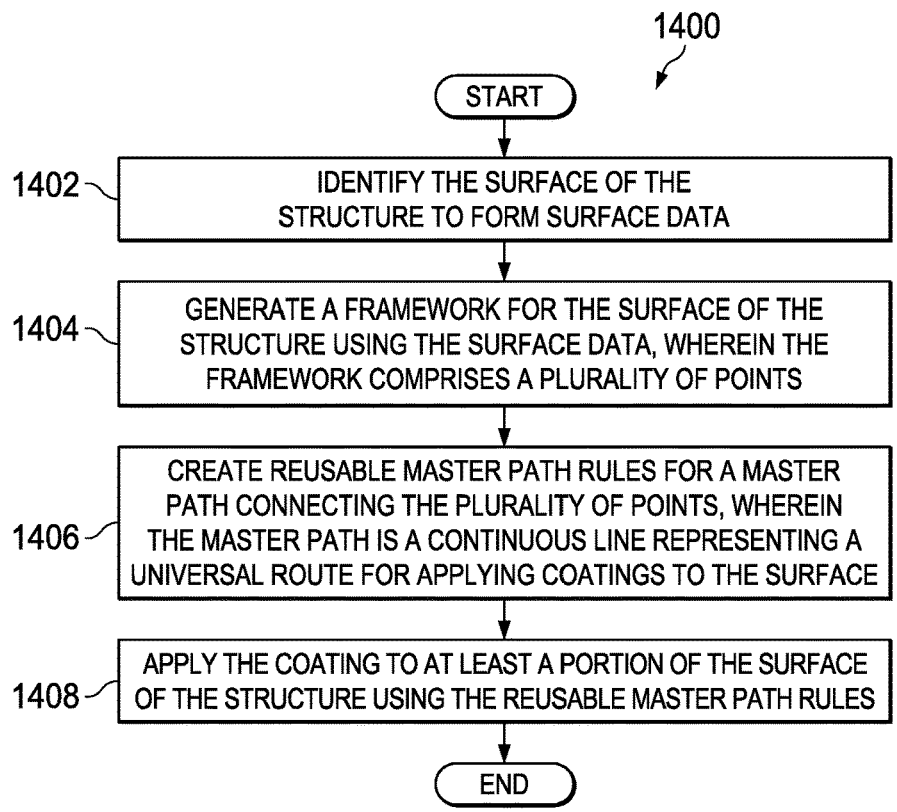
FIG. 14 is an illustration of a flowchart of a process for applying a coating to at least a portion of a surface of a structure using reusable master path rules in accordance with an illustrative embodiment.

Turning now to FIG. 14, an illustration of a flowchart of a process for applying a coating to at least a portion of a surface of a structure using reusable master path rules is depicted in accordance with an illustrative embodiment. Process 1400 may be used to apply coating 206 to at least a portion of surface 208 of structure 202 using reusable master path rules 210 of FIG. 2. Process 1400 may be used to apply a coating to at least a portion of one of surface 300 of FIGS. 3-7 and 12-13 or surface 800 of FIGS. 8-11.

Process 1400 identifies the surface of the structure to form surface data (operation 1402). In some illustrative examples, the structure is an aircraft. In some illustrative examples, identifying the surface of the structure to form the surface data comprises analyzing a three-dimensional model to form the surface data.

Process 1400 generates a framework for the surface of the structure using the surface data, wherein the framework comprises a plurality of points (operation 1404). Process 1400 creates reusable master path rules for a master path connecting the plurality of points, wherein the master path is a continuous line representing a universal route for applying coatings to the surface (operation 1406). Process 1400 applies the coating to the at least a portion of the surface of the structure using the reusable master path rules (operation 1408). Afterwards, the process terminates.

Figure 15:
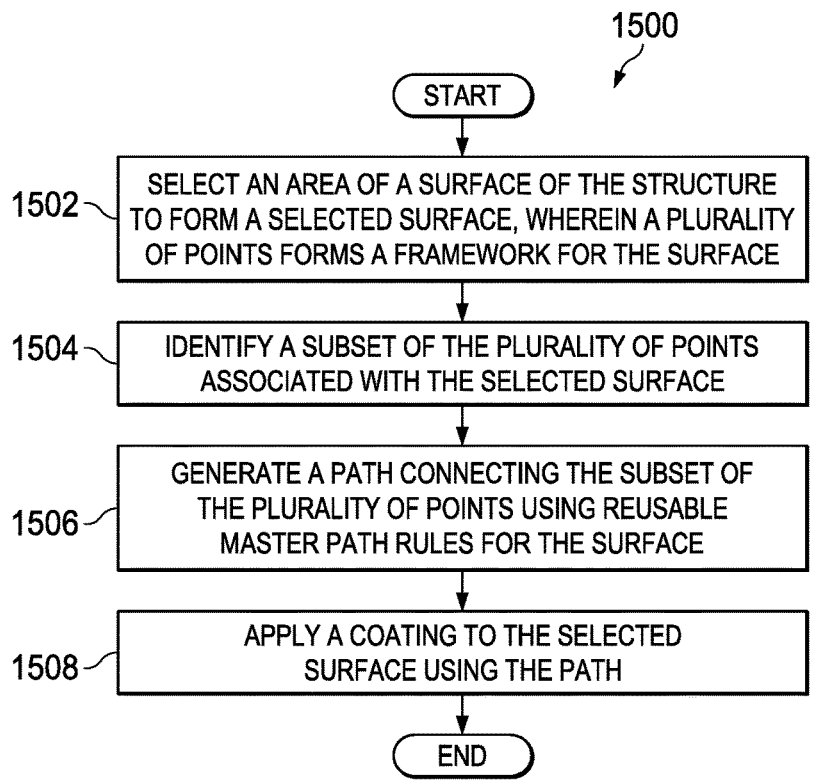
FIG. 15 is an illustration of a flowchart of a process for applying a coating to at least a portion of a surface of a structure using reusable master path rules in accordance with an illustrative embodiment.

Turning now to FIG. 15, an illustration of a flowchart of a process for applying a coating to at least a portion of a surface of a structure using reusable master path rules is depicted in accordance with an illustrative embodiment. Process 1500 may be used to apply coating 206 to at least a portion of surface 208 of structure 202 using reusable master path rules 210 of FIG. 2. Process 1500 may be used to apply a coating to at least a portion of one of surface 300 of FIGS. 3-7 and 12-13 or surface 800 of FIGS. 8-11.

Process 1500 selects an area of the surface of the structure to define a selected surface, wherein a plurality of points forms a framework for the surface (operation 1502). In some illustrative examples, the structure is an aircraft. Process 1500 identifies a subset of the plurality of points associated with the selected surface (operation 1504). Process 1500 generates a path connecting the subset of the plurality of points using the reusable master path rules for the surface (operation 1506). Process 1500 applies a coating to the selected surface using the path (operation 1508). Afterwards the process terminates.

In some illustrative examples, a master path connects the plurality of points using the reusable master path rules. In these examples, the master path is a continuous line representing a universal route for applying coatings to the surface.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative examples, process 1400 further comprises testing a number of coatings on a number of test surfaces to form test data, wherein the number of test surfaces is substantially similar to the surface of the structure, and wherein the reusable master path rules for the master path are created using the test data. Further, each of the number of coatings has at least a minimum desirable quality when applied to the surface of the structure using the master path.

In some other illustrative examples, applying the coating comprises applying the coating using an application tool. In these illustrative examples, process 1400 further comprises selecting application parameters for the application tool using at least one of characteristics of the application tool, environmental characteristics, or characteristics of the coating.

In some examples, the application parameters include at least one of speed of the application tool, pressure, or distance from a surface. In some examples, the characteristics of the application tool include at least one of tool type or plume size. In some examples, the environmental characteristics include at least one of humidity, environmental temperature, or air speed. In further examples, the characteristics of the coating include at least one of viscosity, flash time, or transfer coefficient.

In some illustrative examples, process 1500 further comprises identifying characteristics of an application tool; and identifying characteristics of the coating, wherein identifying the subset of the plurality of points comprises identifying the subset of the plurality of points based on at least one of the characteristics of the application tool or the characteristics of the coating, and wherein applying the coating comprises applying the coating to the selected surface using the application tool. In some examples, process 1500 also further comprises selecting application parameters for the application tool using the characteristics of the application tool and the characteristics of the coating, wherein applying the coating comprises applying the coating to the selected surface using the application tool, the application parameters, and the path.

Figure 16:
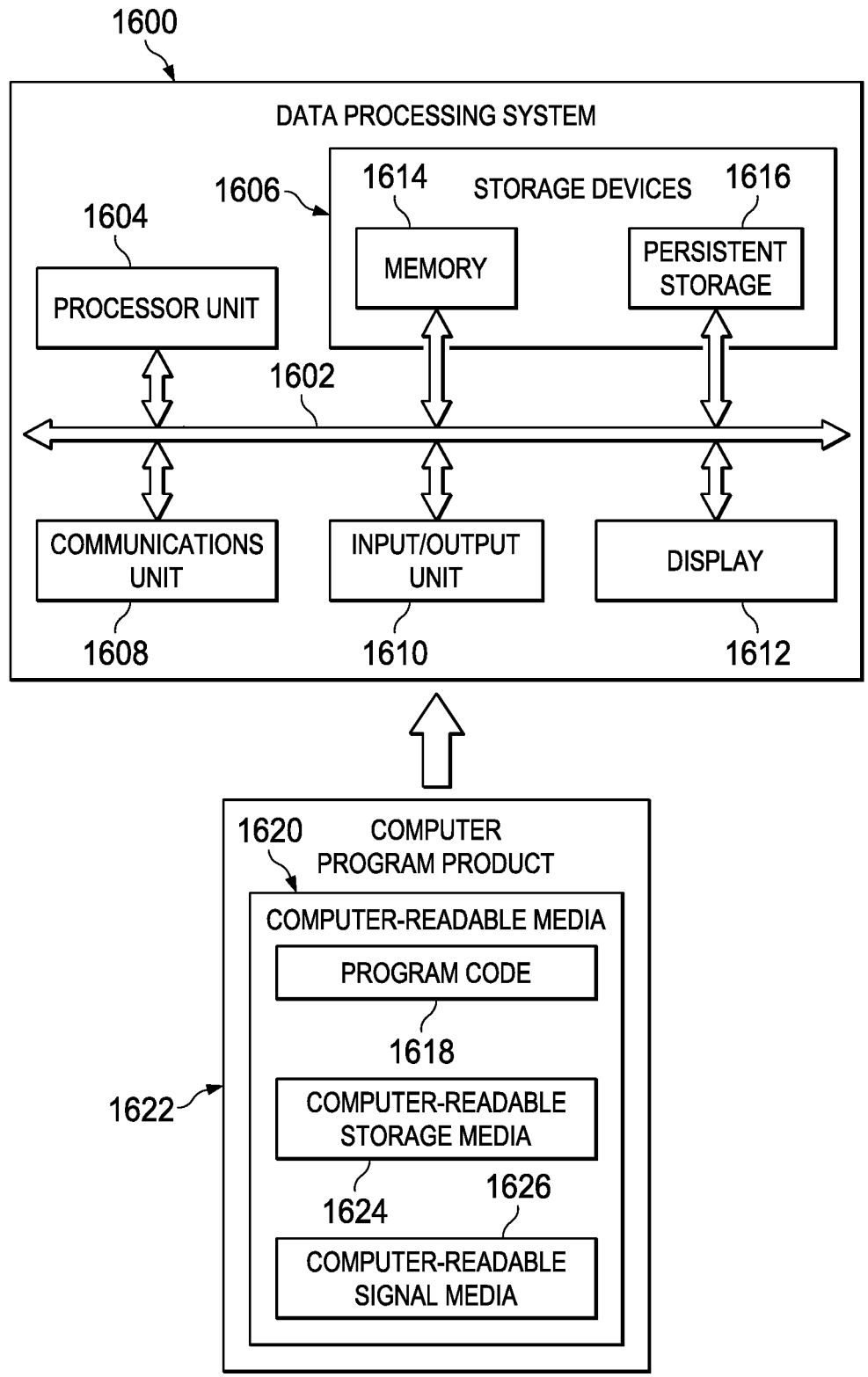
FIG. 16 is an illustration of a data processing system in the form of a block diagram in accordance with an illustrative embodiment.

Turning now to FIG. 16, an illustration of a data processing system is depicted in the form of a block diagram in accordance with an illustrative embodiment. Data processing system 1600 may be used to implement controller 216 in FIG. 2. Data processing system 1600 may be used to implement portions of system 204 of FIG. 2, such as computer system 252. As depicted, data processing system 1600 includes communications framework 1602, which provides communications between processor unit 1604, storage devices 1606, communications unit 1608, input/output unit 1610, and display 1612. In some cases, communications framework 1602 may be implemented as a bus system.

Processor unit 1604 is configured to execute instructions for software to perform a number of operations. Processor unit 1604 may comprise a number of processors, a multi-processor core, and/or some other type of processor, depending on the implementation. In some cases, processor unit 1604 may take the form of a hardware unit, such as a circuit system, an application specific integrated circuit (ASIC), a programmable logic device, or some other suitable type of hardware unit.

Instructions for the operating system, applications, and/or programs run by processor unit 1604 may be located in storage devices 1606. Storage devices 1606 may be in communication with processor unit 1604 through communications framework 1602. As used herein, a storage device, also referred to as a computer-readable storage device, is any piece of hardware capable of storing information on a temporary and/or permanent basis. This information may include, but is not limited to, data, program code, and/or other information.

Memory 1614 and persistent storage 1616 are examples of storage devices 1606. Memory 1614 may take the form of, for example, a random access memory or some type of volatile or non-volatile storage device. Persistent storage 1616 may comprise any number of components or devices. For example, persistent storage 1616 may comprise a hard drive, a flash memory, a rewritable optical disk, a rewritable magnetic tape, or some combination of the above. The media used by persistent storage 1616 may or may not be removable.

Communications unit 1608 allows data processing system 1600 to communicate with other data processing systems and/or devices. Communications unit 1608 may provide communications using physical and/or wireless communications links.

Input/output unit 1610 allows input to be received from and output to be sent to other devices connected to data processing system 1600. For example, input/output unit 1610 may allow user input to be received through a keyboard, a mouse, and/or some other type of input device. As another example, input/output unit 1610 may allow output to be sent to a printer connected to data processing system 1600.

Display 1612 is configured to display information to a user. Display 1612 may comprise, for example, without limitation, a monitor, a touch screen, a laser display, a holographic display, a virtual display device, and/or some other type of display device.

In this illustrative example, the processes of the different illustrative embodiments may be performed by processor unit 1604 using computer-implemented instructions. These instructions may be referred to as program code, computer usable program code, or computer-readable program code and may be read and executed by one or more processors in processor unit 1604.

In these examples, program code 1618 is located in a functional form on computer-readable media 1620, which is selectively removable, and may be loaded onto or transferred to data processing system 1600 for execution by processor unit 1604. Program code 1618 and computer-readable media 1620 together form computer program product 1622. In this illustrative example, computer-readable media 1620 may be computer-readable storage media 1624 or computer-readable signal media 1626.

Computer-readable storage media 1624 is a physical or tangible storage device used to store program code 1618, rather than a medium that propagates or transmits program code 1618. Computer-readable storage media 1624 may be, for example, without limitation, an optical or magnetic disk or a persistent storage device that is connected to data processing system 1600.

Alternatively, program code 1618 may be transferred to data processing system 1600 using computer-readable signal media 1626. Computer-readable signal media 1626 may be, for example, a propagated data signal containing program code 1618. This data signal may be an electromagnetic signal, an optical signal, and/or some other type of signal that can be transmitted over physical and/or wireless communications links.

Figure 17:
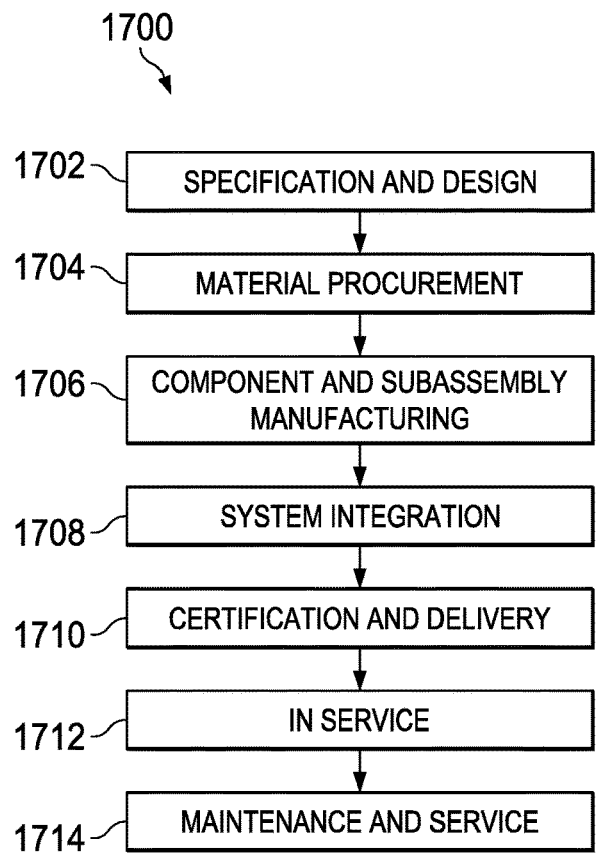
FIG. 17 is an illustration of an aircraft manufacturing and service method in the form of a block diagram in accordance with an illustrative embodiment.
Figure 18:
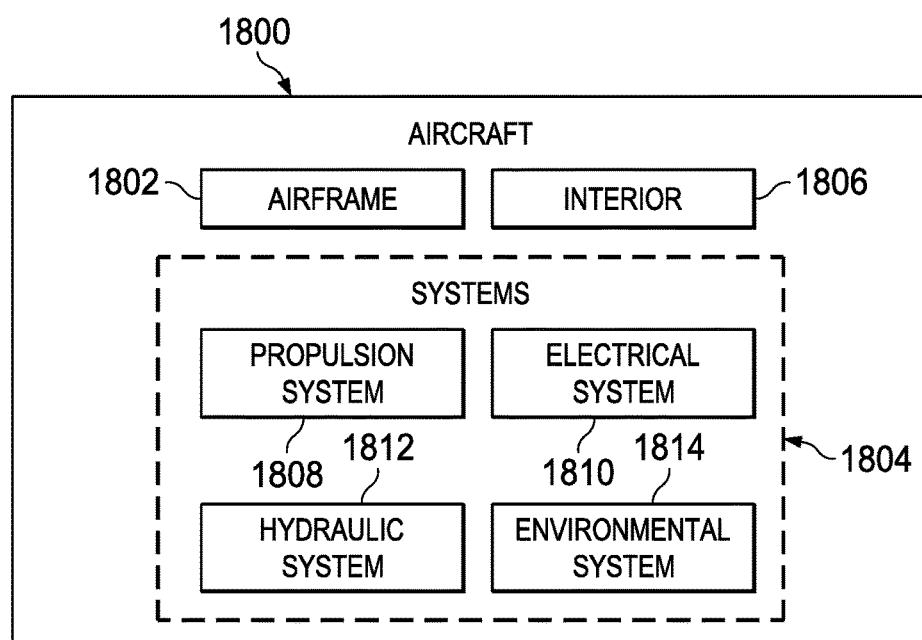
FIG. 18 is an illustration of an aircraft in the form of a block diagram in which an illustrative embodiment may be implemented.

Illustrative embodiments of the present disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During preproduction, aircraft manufacturing and service method 1700 may include specification and design 1702 of aircraft 1800 in FIG. 18 and material procurement 1704.

During production, component and subassembly manufacturing 1706 and system integration 1708 of aircraft 1800 takes place. Thereafter, aircraft 1800 may go through certification and delivery 1710 in order to be placed in service 1712. While in service 1712 by a customer, aircraft 1800 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700. One or more illustrative embodiments may be used during component and subassembly manufacturing 1706 of FIG. 17. For example, coating 206 of FIG. 2 may be applied using reusable master path rules 210 during component and subassembly manufacturing 1706. Coating 206 may be a replacement coating. In these examples, coating 206 may be applied during maintenance and service 1714 of FIG. 17.

By using reusable master path rules to apply a coating, the number of changeable variables for application of the coating is reduced. The reusable master path rules set variables that are not changed from coating to coating. Application parameters are variables that are changed from coating to coating. By having reusable master path rules and adjusting the process by adjusting application parameters for a specific coating, at least one of time, cost, or labor may be reduced.

The illustrative embodiments provide a master path to be developed for coating trajectories and the methods for quickly adapting the master path into smaller areas for different coatings or colors that can use the same parallel path spacing as measured along the object's surface. The master path is created to encompass all, or a large portion of an object, such as an airplane fuselage.

In some illustrative examples, the master path may consist of a series of splines or curves with one of the spline/curves being a reference spline/curve. The reference spline/curve would be created by intersecting a planar surface with the object being painted and creating a spline/curve with a series of points spaced evenly, based on chordal deviation, or both. The other spline/curve entities would be created parallel to the reference spline/curve as measured along the surface and maintain the same distance and/or chordal deviation tolerances used for the reference spline/curve. Each of the spline/curve entities can also be referred to as a 'subpath'. These subpaths would be connected to create the single master path. The application tool would traverse the master path in a serpentine fashion through all the spline/curves or subpaths and the connections. Approach/retract/linking behavior would be applied to either the master path or subpaths. The trajectory could be programmed and simulated for reach and motion of the application tool. Painting parameters can be set.

In some illustrative examples, a subpath may be created by identifying portions of the spline/curves extending through the subset of the plurality of points. After identifying portions of the spline/curves extending through the subset, the portions of the spline/curves are connected in the same fashion as the master path. By connecting, the application tool would traverse the subpath in a serpentine fashion through all the portions of spline/curves and the connections. The connections for the subpath are formed using the same reusable master path rules as used to form the connections for the master path.

With the master path created, a smaller area to be painted can be defined by bounding curves on the original support surface. The user would select to keep the points on the inside or outside of the master path and a new path generated from the master path with the approach/retract and sub-path linking rules based on the master path, but positionally transformed for the smaller area being painted.

Robot positions can be used with minimal position touch-up and the paint parameters updated for the coating/color being applied. The resulting path represents the ideal paint path, but the invention would also create the ideal trigger points for turning the spray head on and off. The sub-paths could vary in robot tip speed, paint flow rate, spray setting, etc. as an adaptation of optimal processing parameters of different coatings or color using the master coating paths because these settings are not directly tied to the part geometric shape.

For robotic painting, not only must the geometric features of the surface to be painted be considered but also the paint system characteristics. These illustrative examples present a master geometric program that is discretized so that subsections can be utilized for application of paints to only smaller sections of a large structure. To ensure proper application parameters, paint systems will be identified based on a certain number of key characteristics (such as viscosity, gun type, flow rate, etc.). Master part programs for any paint system with matching key characteristics can be used and reused, even for a subsection of a large structure, without the need for reprogramming.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of applying a coating to at least a portion of a surface of a structure using reusable master path rules, the method comprising:
    identifying the surface of the structure to form surface data;
    generating a framework for the surface of the structure using the surface data, wherein the framework comprises a plurality of points, and wherein a first spacing for the plurality of points is chosen based on a size of a plume for applying the coating;
    creating reusable master path rules for a master path connecting the plurality of points, wherein the reusable master path rules are a set of universal rules for coatings to be applied to the surface, and wherein the master path is a continuous line representing a universal route for applying the coatings to the surface; and
    applying the coating to the at least a portion of the surface of the structure using the reusable master path rules.

2. The method of claim 1 further comprising:
    testing a number of coatings on a number of test surfaces to form test data, wherein the number of test surfaces are substantially similar to the surface of the structure, and wherein the reusable master path rules for the master path are created using the test data.

3. The method of claim 2, wherein each of the number of coatings has at least a minimum desirable quality when applied to the surface of the structure using the master path.

4. The method of claim 1, wherein applying the coating comprises applying the coating using an application tool and further comprising:
    selecting application parameters for the application tool using at least one of characteristics of the application tool, environmental characteristics, or characteristics of the coating.

5. The method of claim 4, wherein application parameters include at least one of speed of application tool, pressure, or distance from the surface.

6. The method of claim 4, wherein characteristics of the application tool include at least one of tool type or plume size.

7. The method of claim 4, wherein environmental characteristics include at least one of humidity, environmental temperature, or air speed.

8. The method of claim 4, wherein characteristics of the coating include at least one of viscosity, flash time, or transfer coefficient.

9. The method of claim 1, wherein the framework is a grid of the plurality of points, and wherein identifying the surface of the structure to form surface data comprises analyzing a three-dimensional model to form surface data.

10. A method of applying a coating to at least a portion of a surface of a structure using reusable master path rules, the method comprising:
    selecting an area of the surface of the structure to define a selected surface, wherein a plurality of points forms a framework for the surface, wherein a first spacing for the plurality of points is chosen based on a size of a plume for applying the coating;
    identifying a subset of the plurality of points associated with the selected surface;
    generating a path connecting the subset of the plurality of points using the reusable master path rules for the surface, wherein the reusable master path rules are a set of universal rules for coatings to be applied to the surface; and
    applying a coating to the selected surface using the path.

11. The method of claim 10 further comprising:
    identifying characteristics of an application tool; and
    identifying characteristics of the coating, wherein identifying the subset of the plurality of points comprises identifying the subset of the plurality of points based on at least one of the characteristics of the application tool or the characteristics of the coating, and wherein applying the coating comprises applying the coating to the selected surface using the application tool.

12. The method of claim 11 further comprising:
    selecting application parameters for the application tool using the characteristics of the application tool and the characteristics of the coating, wherein applying the coating comprises applying the coating to the selected surface using the application tool, the application parameters, and the path.

13. The method of claim 10, wherein a master path connects the plurality of points using the reusable master path rules, and wherein the master path is a continuous line representing a universal route for applying coatings to the surface.

14. The method of claim 10, wherein the structure is an aircraft.

15. A system for applying a coating to at least a portion of a surface of a structure using reusable master path rules, the system comprising:
    a framework generator configured to generate a framework for the surface of the structure using surface data, wherein the framework comprises a plurality of points, and wherein a first spacing for the plurality of points is chosen based on a size of a plume for applying the coating;
    a master path generator configured to create reusable master path rules for a master path connecting the plurality of points, wherein the reusable master path rules are a set of universal rules for coatings to be applied to the surface, and wherein the master path is a continuous line representing a universal route for applying the coatings to the surface; and
    a controller configured to control an application tool to apply the coating to the at least a portion of the surface of the structure using the reusable master path rules.

16. The system of claim 15, wherein the framework generator is further configured to identify the surface of the structure to form the surface data, wherein the framework is a grid of the plurality of points, and wherein identifying the surface of the structure comprises analyzing a three-dimensional model to form the surface data.

17. A system for applying a coating to at least a portion of a surface of a structure using reusable master path rules, the system comprising:
    a path generator configured to identify a subset of a plurality of points associated with a selected surface and generate a path connecting the subset of the plurality of points, wherein the selected surface is an area of the surface of the structure, wherein the plurality of points forms a framework for the surface, wherein a first spacing for the plurality of points is chosen based on a size of a plume for applying the coating, wherein generating the path connecting the subset of the plurality of points uses the reusable master path rules for the surface, and wherein the reusable master path rules are a set of universal rules for coatings to be applied to the surface; and a controller configured to control an application tool to apply the coating to the selected surface using the path.

18. The system of claim 17, wherein the path generator is further configured to select an area of a surface of a structure to form the selected surface.

19. The system of claim 17 further comprising:

the application tool configured to apply a coating to the selected surface; and a parameters generator configured to select application parameters for the application tool using characteristics of the application tool and characteristics of the coating.

20. The system of claim 19, wherein the controller is configured to control the application tool according to the application parameters.

* * * * *